United States Patent
Her et al.

(10) Patent No.: US 7,361,223 B2
(45) Date of Patent: Apr. 22, 2008

(54) METHOD AND APPARATUS FOR ELIMINATING A DISPLAY DEFECT IN A LIQUID CRYSTAL DISPLAY DEVICE

(75) Inventors: Seung-Hee Her, Asan-si (KR);
Tai-Huem Om, Asan-si (KR);
Jin-Whal Kim, Cheonan-si (KR);
Min-Young Won, Yongin-si (KR);
Kun-Jong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 216 days.

(21) Appl. No.: 11/190,462

(22) Filed: Jul. 27, 2005

(65) Prior Publication Data
US 2006/0054080 A1  Mar. 16, 2006

(30) Foreign Application Priority Data
Sep. 16, 2004  (KR) ...................... 10-2004-0074119

(51) Int. Cl.
*C30B 35/00* (2006.01)

(52) U.S. Cl. .................. 117/206; 117/200; 117/900
(58) Field of Classification Search ............... 117/200, 117/900, 206
See application file for complete search history.

(56) References Cited

U.S. PATENT DOCUMENTS 6,020,867 A  *  2/2000 Shimada et al. .............. 345/87

* cited by examiner

*Primary Examiner*—Felisa Hiteshew
(74) *Attorney, Agent, or Firm*—Cantor Colburn LLP (57) ABSTRACT

A method for eliminating a display defect in a liquid crystal display device includes disposing a liquid crystal panel adhered with a polarizer into a first buffer chamber, increasing pressure of the first buffer chamber, communicating the first buffer chamber with a reactor chamber having a predetermined pressure, transferring the liquid crystal panel from the first buffer chamber to the reactor chamber, increasing pressure of a second buffer chamber, communicating the second buffer chamber with the reactor chamber, and transferring the liquid crystal panel from the reactor chamber to the second buffer chamber.

16 Claims, 8 Drawing Sheets

METHOD AND APPARATUS FOR ELIMINATING A DISPLAY DEFECT IN A LIQUID CRYSTAL DISPLAY DEVICE

This application claims the priority of Korean Patent Application No. 10-2004-0074119 filed on Sep. 16, 2004, in the Korean Intellectual Property Office, the disclosure of which is incorporated herein in its entirety by reference.

BACKGROUND OF THE INVENTION (a) Field of the Invention

The present invention relates to a method and apparatus for eliminating a display defect in a liquid crystal display device, and in particular, to a method and apparatus for removing a bubble between a substrate and a polarizer.

(b) Description of Related Art

Generally, a liquid crystal display device includes a liquid crystal panel. The liquid crystal panel includes a thin film transistor (TFT) array substrate, a color filter substrate, and a liquid crystal layer disposed between the TFT array substrate and the cooler filter substrate. Typically, the TFT array substrate and the cooler filter substrate each include an attached polarizer. Since TFTs are non-emissive elements, a backlight unit for providing light to the TFT array substrate is usually located at a rear side of the liquid crystal panel. Transmittance of light emitted from the backlight unit and passing through the liquid crystal panel is controlled by altering orientations of liquid crystal molecules in the liquid crystal layer.

In addition, the liquid crystal display device includes a controller, a data driver, and a gate driver, so as to drive pixels of the liquid crystal panel. The data driver and the gate driver supply a voltage to data lines and gate lines, respectively, responsive to signals from the controller.

As stated above, polarizers are often attached to an exterior surface of both the TFT array substrate and the cooler filter substrate. However, a bubble may be formed between the exterior surface of either the TFT array substrate or the color filter substrate and a corresponding one of the polarizers. Such a bubble deteriorates adhesion between either the TFT array substrate or the color filter substrate and the corresponding one of the polarizers, thereby deteriorating display quality.

Figure 1:
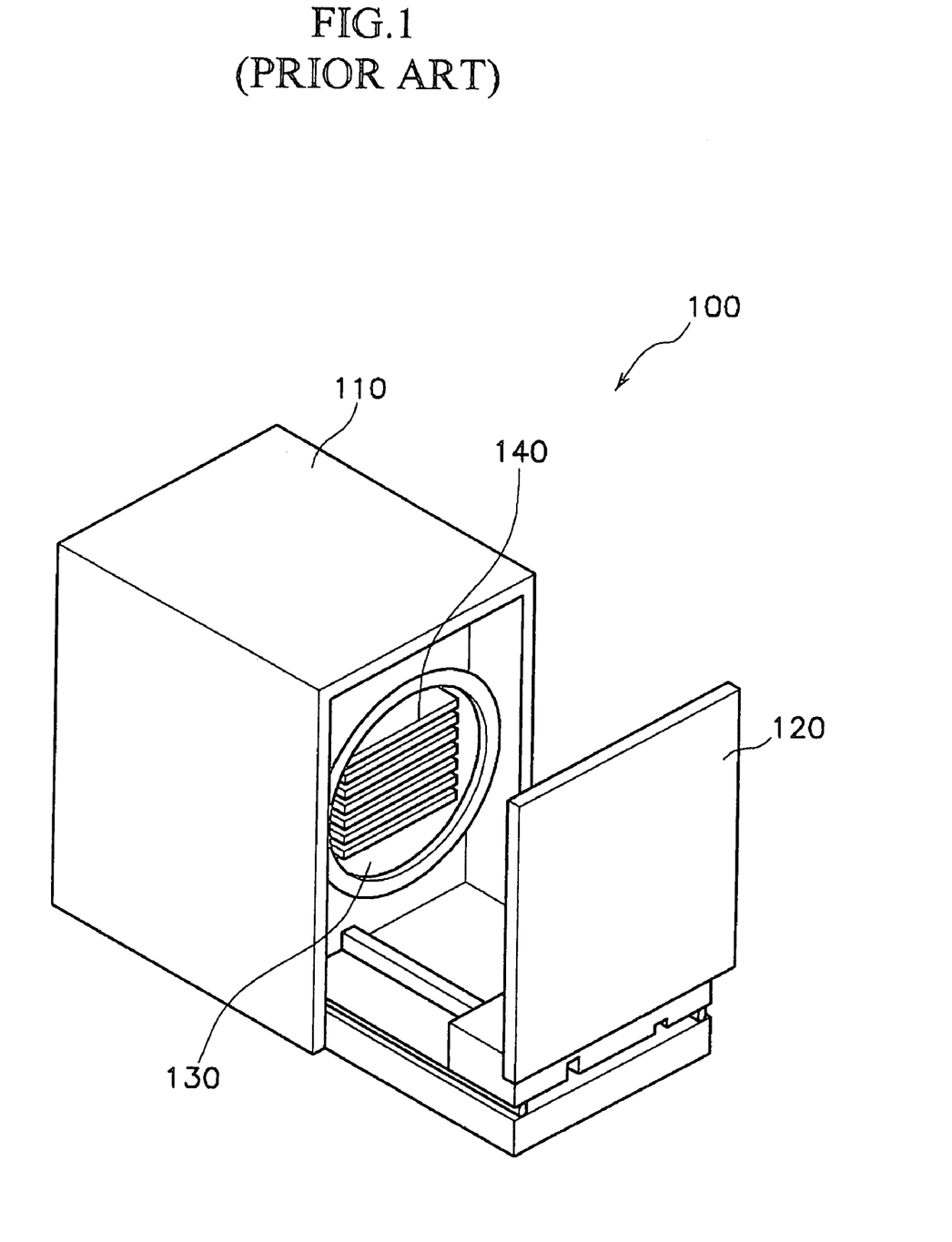
FIG. 1 is a perspective view of a conventional bubble removing apparatus.

FIG. 1 is a perspective view showing a bubble removing apparatus according to the prior art.

As shown in FIG. 1, a bubble removing apparatus 100 according to the prior art includes a case 110 forming a chamber 130 and a door 120 that may be opened and closed for allowing entry into the case 110. The chamber 130 accommodates a liquid crystal panel 140. In addition, the bubble removing apparatus 100 according to the prior art includes a pump (not shown) for supplying gas to provide a predetermined pressure in the chamber 130, and a heater (not shown) for supplying heat to provide a predetermined temperature in the chamber 130.

A method for removing a bubble using the bubble removing apparatus 100 according to the prior art will hereinafter be described.

The door 120 is drawn to open the case 110 and expose the chamber 130. Thereafter, a plurality of liquid crystal panels 140 are loaded in the chamber 130 at one time. During loading of the liquid crystal panels, a temperature and pressure of the chamber 130 are room temperature and atmospheric pressure, respectively. After the liquid crystal panels 140 are loaded in the chamber 130, the door 120 is closed such that the chamber 130 becomes airtight.

Thereafter, the temperature and the pressure of the chamber 130 are increased to predetermined levels. The increased temperature and pressure cause a bubble formed between an external surface of a substrate and a polarizer to move to an edge of the substrate of each of the liquid crystal panels 140. At a sufficient temperature and pressure, the bubble is forced off the edge of the substrate and is thus removed. After the bubble is removed, the temperature and pressure of the chamber 130 are decreased back to room temperature and atmospheric pressure. Thereafter, the door 120 is opened to expose the chamber 130, and the liquid crystal panels 140 are extracted from the chamber 130.

Figure 2:
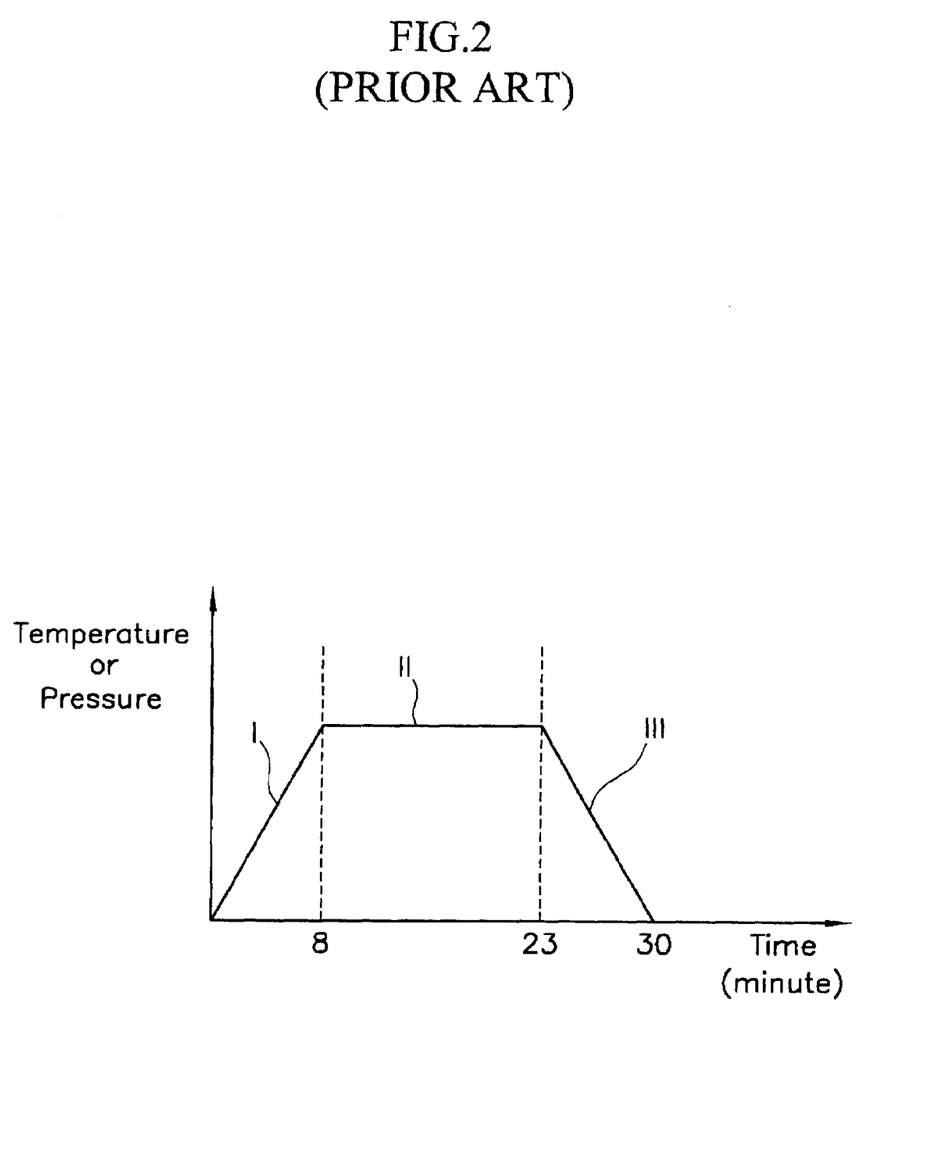
FIG. 2 is a graph showing changes of temperature and pressure of a chamber of the conventional bubble removing apparatus of FIG. 1 with respect to time.

FIG. 2 is a graph showing changes of temperature and pressure in the chamber 130 with respect to time, according to such a conventional bubble removing apparatus.

Section "I" in FIG. 2 shows a first step in which the temperature and pressure of the chamber 130 are increased from room temperature and atmospheric pressure to the predetermined temperature and pressure, respectively. The first step consumes about 8 minutes. Section "II" in FIG. 2 shows a second step in which the temperature and pressure of the chamber 130 are maintained at the predetermined temperature and pressure, respectively. The second step consumes about 15 minutes. Section "III" in FIG. 2 shows a third step in which the temperature and pressure of the chamber 130 are respectively decreased from the predetermined temperature and pressure to room temperature and atmospheric pressure. The third step consumes about 7 minutes.

A conventional bubble removing method as described above has several drawbacks including those described below.

First, since the liquid crystal panels 140 are placed into and extracted from the chamber 130 at room temperature and atmospheric pressure, excessive time is consumed for increasing (or decreasing) the temperature and pressure of the chamber 130 to the predetermined temperature and pressure (or to room temperature and atmospheric pressure).

Second, the liquid crystal panels 140 are loaded into and extracted from the chamber 130 in discrete batches. Accordingly, a separate process line is required, such as, for example, a transferring process line in which the batch of the liquid crystal panels 140 is transferred by a transferring device separate from a conveyer line. Operation of the separate process line means the liquid crystal panels 140 are subject to additional handling, which must be done with great care in order to prevent damage to the liquid crystal panels 140. Such additional handling adds to production time, and particularly if a size of a liquid crystal panel 140 is large, more caution is required to prevent the liquid crystal panel 140 from being interfered with by surrounding devices.

Third, a production process involving the conventional bubble removing method is not completed within one assembly line, and accordingly productivity is deteriorated.

SUMMARY OF THE INVENTION

The present invention has been made in an effort to provide a method and apparatus for manufacturing liquid crystal displays having an advantage of resolving the above-mentioned problems, and in addition, having an advantage of enhanced productivity.

An exemplary method for eliminating a display defect in a liquid crystal display device according to an exemplary embodiment of the present invention includes disposing a liquid crystal panel adhered with a polarizer into a first buffer chamber, increasing pressure of the first buffer chamber, communicating the first buffer chamber with a reactor chamber having a predetermined pressure, transferring the liquid crystal panel from the first buffer chamber to the reactor chamber, increasing pressure of a second buffer chamber, communicating the second buffer chamber with the reactor chamber, and transferring the liquid crystal panel from the reactor chamber into the second buffer chamber.

An exemplary method for eliminating a display defect in a liquid crystal display device according to another exemplary embodiment of the present invention includes disposing a first liquid crystal panel adhered with a polarizer into a first buffer chamber, increasing pressure of the first buffer chamber, communicating the first buffer chamber with a reactor chamber having a predetermined pressure, the reactor chamber already accommodating a second liquid crystal panel, transferring the liquid crystal panel of the first buffer chamber to the reactor chamber; increasing pressure of a second buffer chamber, communicating the second buffer chamber with the reactor chamber, and transferring the second liquid crystal panel from the reactor chamber to the second buffer chamber.

An exemplary apparatus for eliminating a display defect in a liquid crystal display device according to an exemplary embodiment of the present invention includes a reactor, a first buffer, and a second buffer. The reactor includes a reactor chamber for accommodating a liquid crystal panel, an entrance for receiving the liquid crystal panel into the reactor chamber, and an exit for removing the liquid crystal panel from the reactor chamber. The first buffer includes a first buffer chamber for accommodating the liquid crystal panel. The first buffer chamber is communicable with the reactor chamber via the entrance. The second buffer includes a second buffer chamber for accommodating the liquid crystal panel. The second buffer chamber is communicable with the reactor chamber via the exit.

BRIEF DESCRIPTION OF THE DRAWINGS

The present invention will become more apparent by describing exemplary embodiments thereof in detail with reference to the accompanying drawings, in which.

DETAILED DESCRIPTION OF THE INVENTION

The present invention will be described more fully hereinafter with reference to the accompanying drawings, in which exemplary embodiments of the invention are shown. This invention may, however, be embodied in many different forms and should not be construed as limited to the embodiments set forth herein.

Figure 3A:
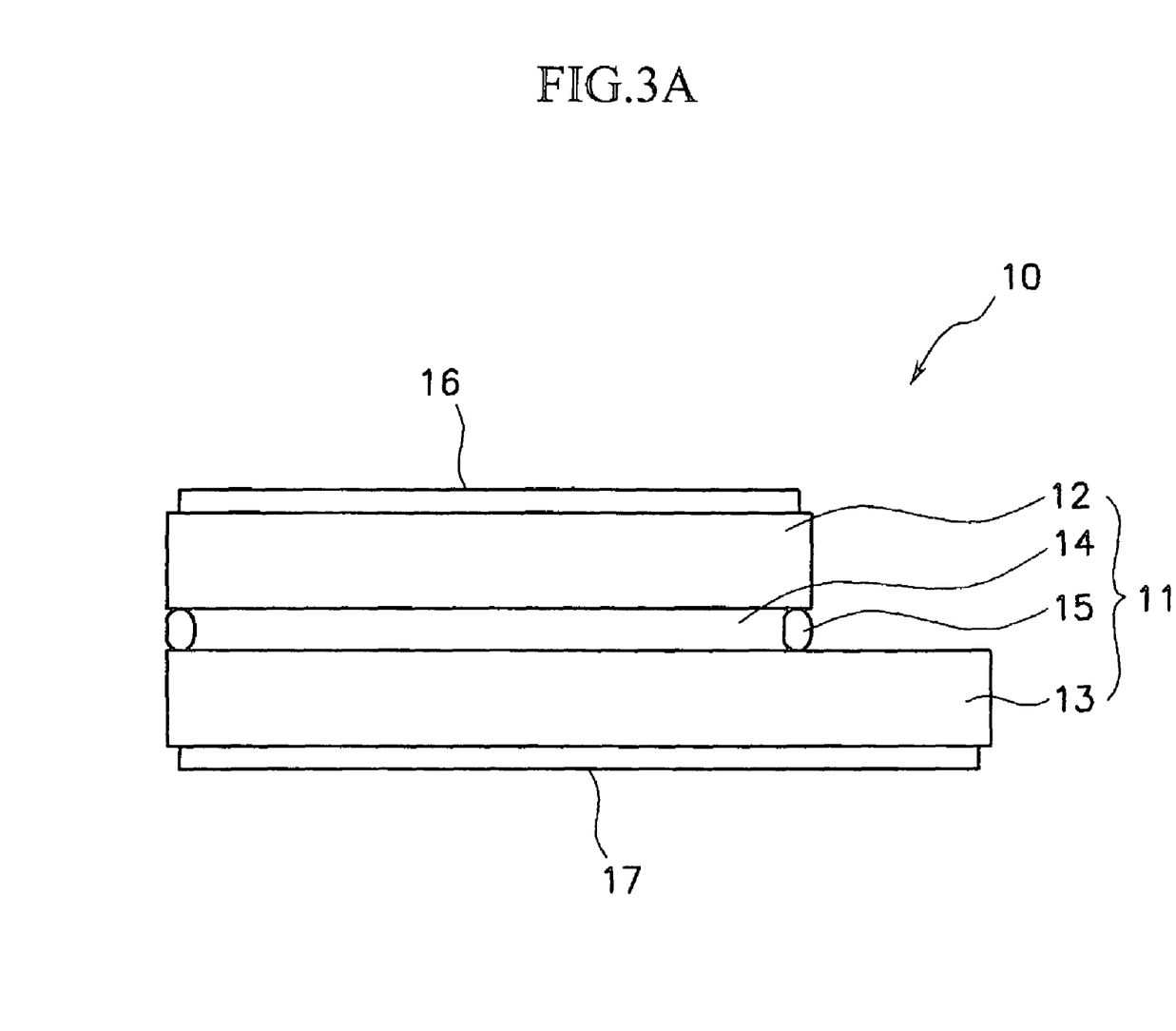
FIG. 3A is a sectional view of a liquid crystal panel according to an exemplary embodiment of the present invention.
Figure 3B:
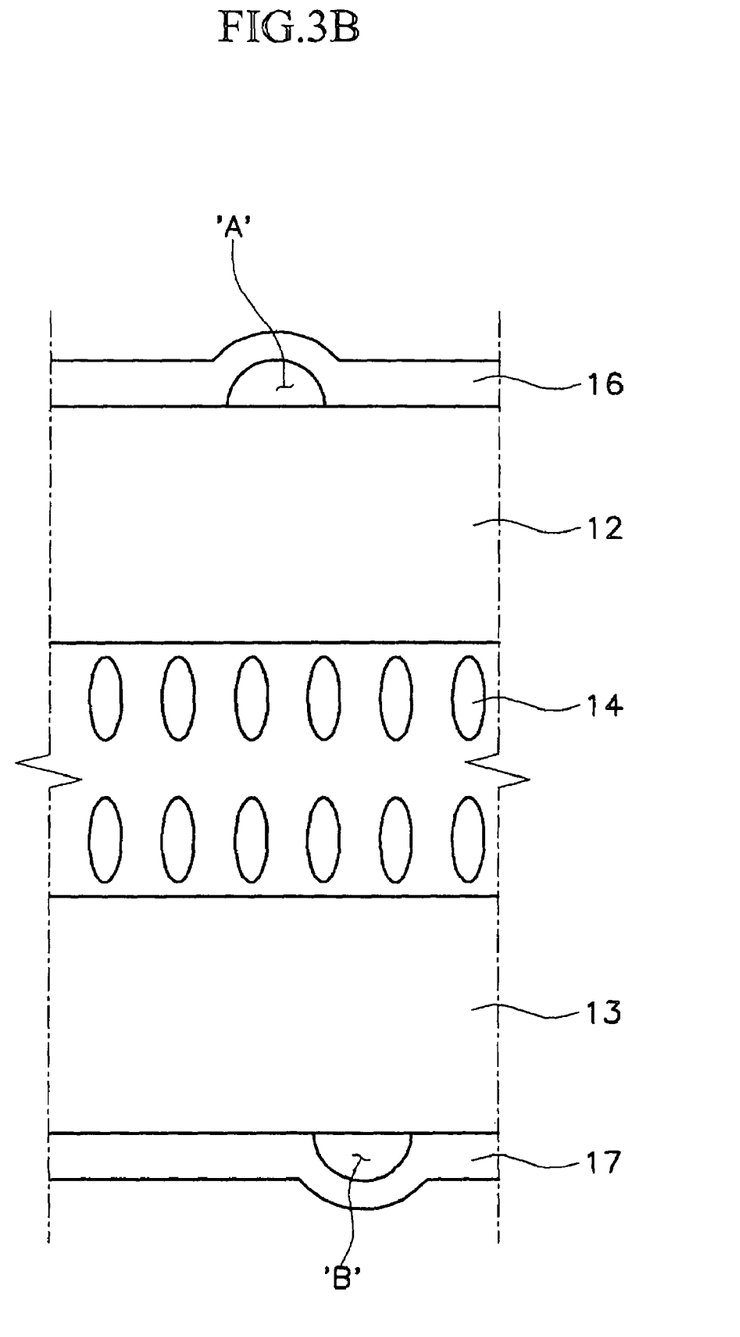
FIG. 3B is an enlarged view of a portion of the liquid crystal panel shown in FIG. 3A.

FIG. 3A is a sectional view of a liquid crystal panel according to an exemplary embodiment of the present invention, and FIG. 3B is an enlarged view of a portion of the liquid crystal panel shown in FIG. 3A, showing a bubble formed between each substrate and each polarizer of the liquid crystal panel.

A liquid crystal panel 10 includes a substrate assembly 11, a first polarizer 16 and a second polarizer 17. The first and second polarizers 16 and 17 are each adhered to an opposite external surface of the substrate assembly 11.

The substrate assembly 11 includes a color filter substrate 12, a thin film transistor array substrate 13, a liquid crystal layer 14, and a sealing member 15. The liquid crystal layer 14 is disposed between the color filter and thin film transistor array substrates 12 and 13.

The thin film transistor array substrate 13 may be larger than the color filter substrate 12 to allow room for disposing a driving circuit (not shown) on the thin film transistor array substrate 13.

Although it is not shown in the drawing, the color filter substrate 12 is provided with a light blocking member (e.g., a black matrix), color filters, common electrodes, and so forth. In addition, the thin film transistor array substrate 12 is provided with thin film transistors, gate lines, data lines, pixel electrodes, and so forth.

An arrangement of liquid crystal molecules disposed in the liquid crystal layer 14 is changed according to voltages of common electrodes and pixel electrodes, which are disposed at opposite sides of the liquid crystal layer 14.

The first and second polarizers 16 and 17 are adhered on both external surfaces of the substrate assembly 11. In other words, the first and second polarizers 16 and 17 are adhered on an external surface of the color filter substrate 12 and the thin film transistor array substrate 13, respectively. The first and second polarizers 16 and 17 are employed because a liquid crystal display device uses a birefringence characteristic of liquid crystal.

However, as shown in FIG. 3b, while the first and second polarizers 16 and 17 are being adhered to both external surfaces of the substrate assembly 11 by an adhesive, bubbles A (or B) may be formed between either of the first and second polarizers 16 and 17 and a corresponding one of the color filter and thin film transistor array substrates 12 and 13. Such a bubble deteriorates adhesion between the color filter and thin film transistor array substrates 12 and 13 and the first and second polarizers 16 and 17, thereby deteriorating display quality.

A liquid crystal display device manufacturing apparatus according to an exemplary embodiment of the present invention will hereinafter be described in detail with reference to FIG. 4.

Figure 4:
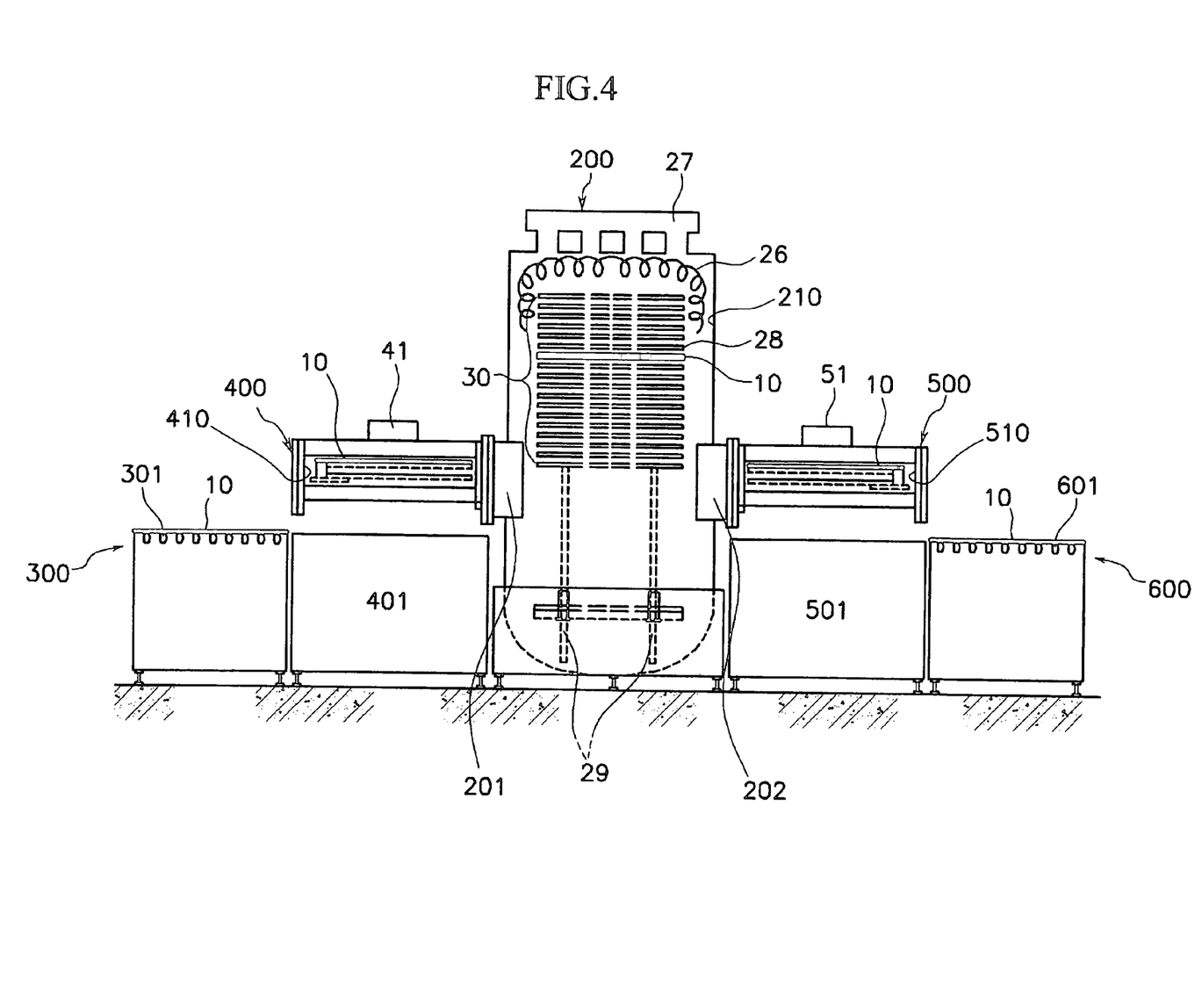
FIG. 4 is a schematic view of a bubble removing apparatus according to an exemplary embodiment of the present invention.

FIG. 4 is a schematic view of a bubble removing apparatus according to an exemplary embodiment of the present invention.

As shown in FIG. 4, the bubble removing apparatus according to an exemplary embodiment of the present invention includes a reactor 200 including a reactor chamber 210 that accommodates a liquid crystal panel 10, a first buffer 400 including a first buffer chamber 410 that is communicated with the reactor chamber 210 when needed, and a second buffer 500 including a second buffer chamber 510 that is communicated with the reactor chamber 210 when needed.

In addition, the bubble removing apparatus according to an exemplary embodiment of the present invention further includes first and second conveyers 300 and 600 that are positioned at lower sides of the first and second buffers 400 and 500, respectively.

The reactor 200 further includes an entrance 201 and an exit 202. The entrance 201 is communicated with the first buffer chamber 410 such that the liquid crystal panel 10 may be moved from the first buffer chamber 410 into the reactor chamber 210. The exit 202 is communicated with the second buffer chamber 510 such that the liquid crystal panel 10 may be moved from the reactor chamber 210 into the second buffer chamber 510.

The reactor 200 further includes a loader 30 and a lifter 29. The loader 30 includes racks 28 for receiving liquid crystal panels 10. The racks 28 are vertically arranged in at least one column. The lifter 29 vertically moves and rotates the loader 30. The loader 30 positions racks 28 at a same height as the first and second buffer chambers 410 and 510 in order to move the liquid crystal panel 10 into and out of the reactor chamber 210.

The reactor 200 further includes a gas pressure supplier 27 that is disposed on an upper portion of the reactor 200. The gas pressure supplier 27 supplies gas pressure to the reactor chamber 210, so as to put pressure upon a liquid crystal panel 10 disposed on one of the racks 28. A fan or a pump may be used as the gas pressure supplier 27. The gas generated from the gas pressure supplier 27 may be GN2, AIR, PN2 (Purified N2), $O_2$, $H_2$, or Ar, and it is preferable that the gas is clean air. The gas pressure in the reactor chamber 210 may be about 1 $kgf/cm^2$ to about 6 $kgf/cm^2$, and it is preferable that the gas pressure is about 5 $kgf/cm^2$. In response to a gas pressure that is higher than atmospheric pressure being uniformly exerted on a surface of the liquid crystal panel 10, a bubble between the color filter substrate 12 and the first polarizer 16 (or between the thin film transistor array substrate 13 and the second polarizer 17) is pushed toward an edge of the liquid crystal panel 10 by the gas pressure, and consequently the bubble is removed from the liquid crystal panel 10.

The reactor 200 further includes a heat supplier 26 disposed on an upper portion of the reactor 200. The heat supplier 26 supplies heat to the reactor chamber 210 to increase a temperature of the reactor chamber 210. An example of a heat supplier 26 includes a heat wire. A suitable temperature range for removing the bubbles is about 40° C. to about 80° C., and a preferable temperature is about 50° C. Accordingly, the bubble can be easily removed, because viscosity of the adhesive is decreased in the suitable temperature range. If the temperature of the reactor chamber 210 is less than 40° C., the viscosity of the adhesive is not sufficiently decreased, and if the temperature of the reactor chamber 210 is more than 80° C., the first and second polarizers 16 and 17 may be damaged.

In alternative exemplary embodiments, the reactor 200 may include the gas pressure supplier 27, the heat supplier 26, or both the gas pressure supplier 27 and the heat supplier 26. In any of the above listed exemplary embodiments, the bubble can be removed by either pressure or heat.

The reactor 200 may further include a temperature sensor (not shown) and a pressure sensor (not shown) so as to detect the temperature and pressure of the reactor chamber 210.

In addition, the bubble removing apparatus according to an exemplary embodiment of the present invention may further include a controller (not shown) for controlling the gas pressure and the temperature of the reactor chamber 210 that are generated by the gas pressure supplier 27 and heat supplier 26, respectively.

The first buffer 400 includes a first buffer gas pressure supplier 41 and a heat supplier (not shown) for supplying gas pressure and heat to the first buffer chamber 410, and a transferring arm (not shown) for transferring the liquid crystal panel 10. In addition, the second buffer 500 includes a second buffer gas pressure supplier 51 and a heat supplier (not shown) for supplying gas pressure and heat to the second buffer chamber 510, and a transferring arm (not shown) for transferring the liquid crystal panel 10. The heat supplier (not shown) may be omitted in an alternative exemplary embodiment.

The transferring arm of the first buffer 400 transfers a liquid crystal panel 10 from the first conveyor 300 to the first buffer chamber 410, and transfers the liquid crystal panel 10 from the first buffer chamber 410 to the reactor chamber 200. The transferring arm of the second buffer 500 transfers a liquid crystal panel 10 from the reactor chamber 210 to the second buffer chamber 510, and transfers the liquid crystal panel 10 from the second buffer chamber 510 to the second conveyor 600. The transferring arms of the first and second buffers 400 and 500 may move and rotate vertically and horizontally. In an alternative exemplary embodiment, each of the first and the second buffers 400 and 500 may include a turntable instead of the transferring arm.

The first conveyor 300 includes a first roller 301 and a first supporter 401, and the second conveyor 600 includes a second roller 601 and a second supporter 501. The first and second rollers 301 and 601 are driven by a driving motor (not shown). In an alternative exemplary embodiment, the first and second conveyors 300 and 600 may be replaced with another device for moving liquid crystal panels 10, thus the scope of the present invention is not limited thereto.

A method for eliminating a display defect in a liquid crystal panel using a bubble removing apparatus according to an exemplary embodiment of the present invention will hereinafter be described in detail with reference to FIGS. 5 to 7.

Figure 5:
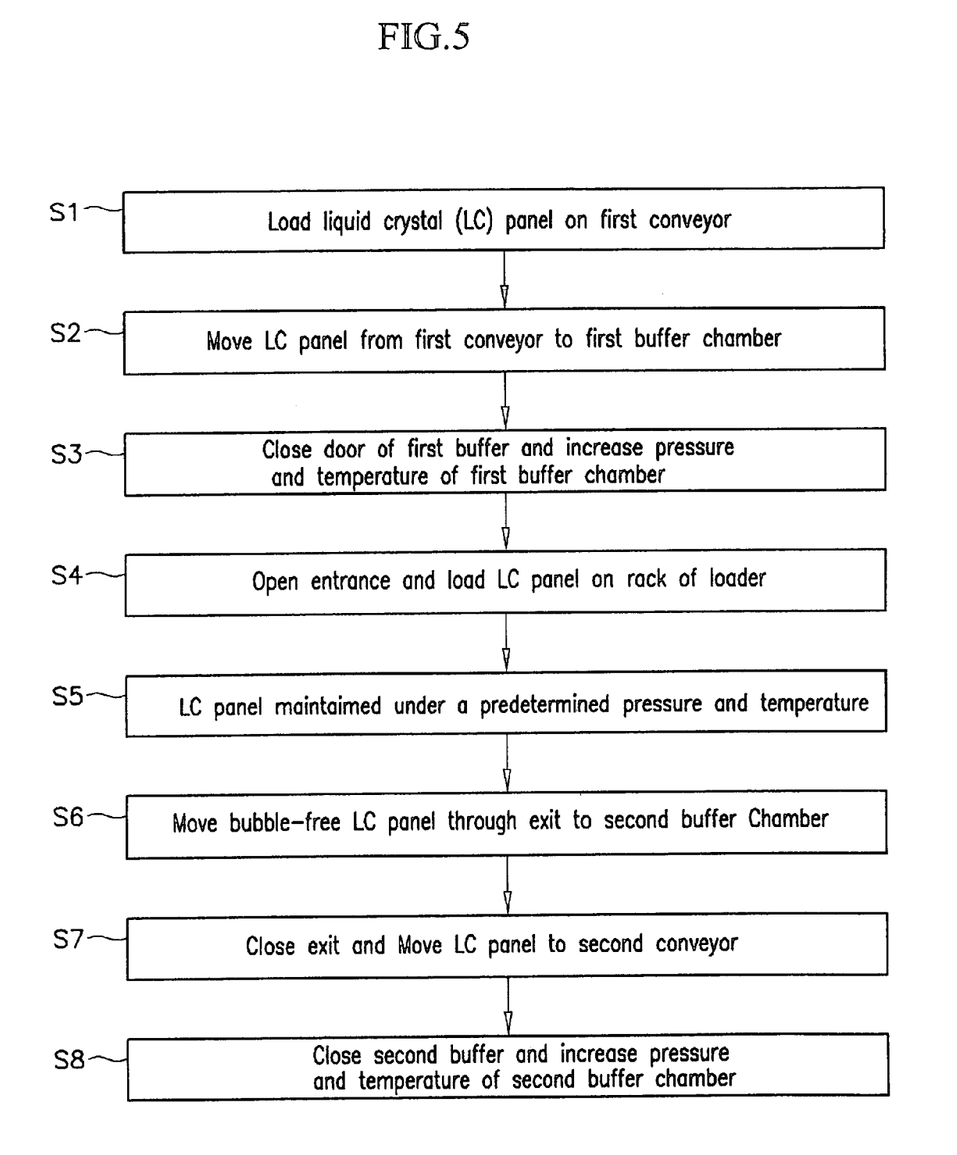
FIG. 5 is a flowchart showing a method for removing a bubble in a liquid crystal panel using a bubble removing apparatus shown in FIG. 4.

FIG. 5 is a flowchart showing a method for removing a bubble of a liquid crystal panel using a bubble removing apparatus shown in FIG. 4. FIG. 6 is a graph showing a variation of temperature and pressure of first and second buffer chambers and a reactor chamber over time while a bubble is removed by a bubble removing apparatus according to an exemplary embodiment of the present invention. FIG. 7 is a plan view of a liquid crystal panel showing a state in which a bubble is being removed.

In the method, the liquid crystal panel 10 (or LC panel) on which first and second polarizers 16 and 17 are adhered to both external surfaces of the substrate assembly 11 is loaded on the first conveyor 300 at block S1 in FIG. 5. In an alternative exemplary embodiment, a number of liquid crystal panels loaded on the first conveyor 300 at one time may be more than one, the liquid crystal panels may be partitioned into a group, and the group of liquid crystal panels may be accommodated on a tray (not shown) and loaded on the first conveyor 300.

Thereafter, the liquid crystal panel 10 arrives at the first buffer 400 via the first conveyor 300 and, after a door of the first buffer 400 is opened, the transferring arm of the first buffer 400 moves the liquid crystal panel 10 from the first conveyer 300 to the first buffer chamber 410 at block S2.

The door of the first buffer 400 is closed, and pressure and temperature of the first buffer chamber 410 are increased to a pressure and temperature of the reactor chamber 210 at block S3.

Figure 6:
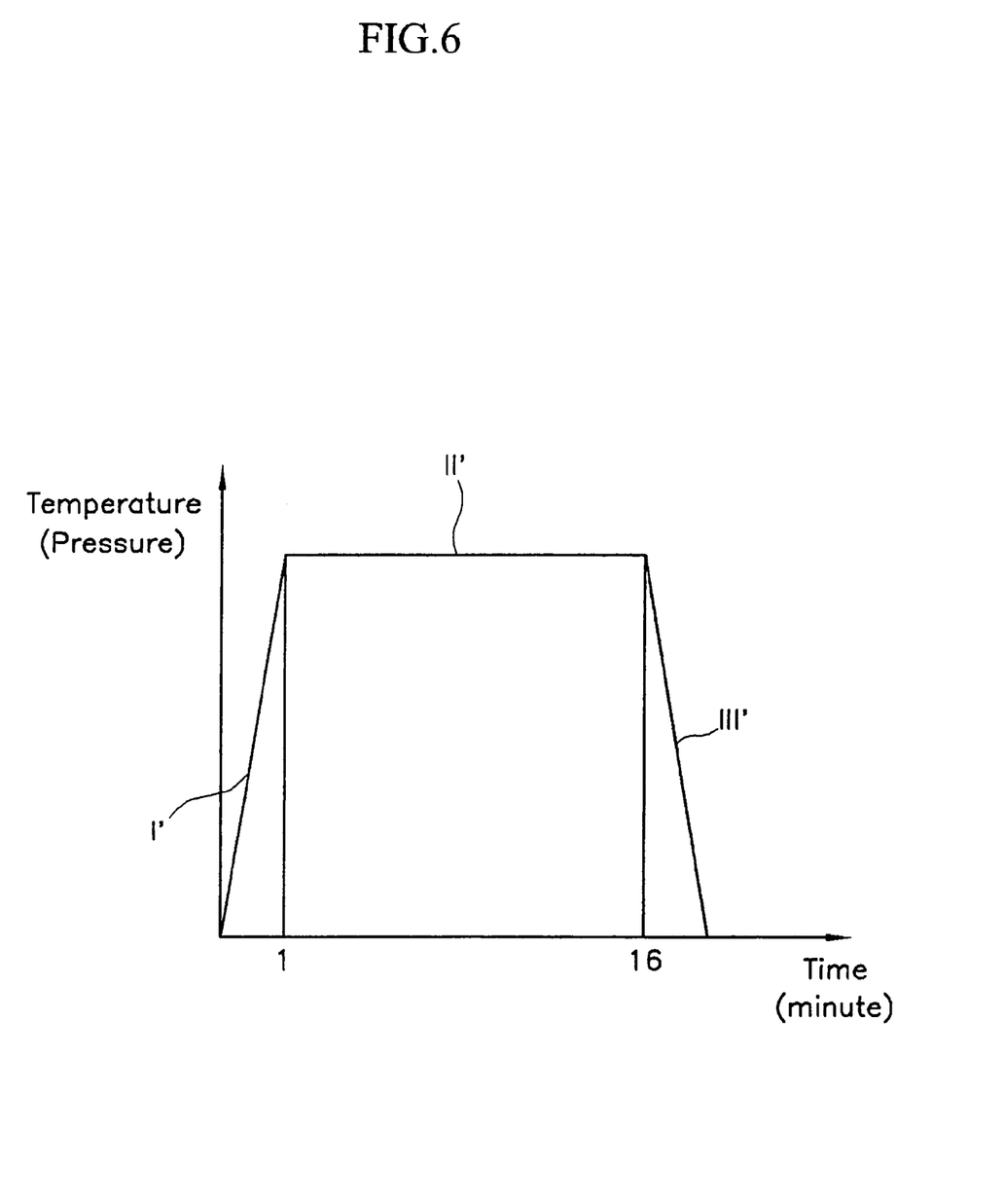
FIG. 6 is a graph showing changes of temperature and pressure of first and second buffer chambers and a reactor chamber with respect to time, while a bubble is removed by a bubble removing apparatus according to an exemplary embodiment of the present invention.

Section "I" in FIG. 6 shows an amount of time that is consumed while the pressure and temperature of the first buffer chamber 410 are increased from atmospheric pressure and room temperature to the pressure and temperature of the reactor chamber 210 at block S3. The time that is consumed is about 1 minute. Accordingly, about 7 minutes are saved in comparison with a conventional scheme.

At block S4, the entrance 201 of the reactor 200 is opened and the liquid crystal panel 10 is transferred into the reactor chamber 210 after a rack 28 of the loader 30 is moved by the lifter 29 so as to enable loading of the liquid crystal panel 10 onto the rack 28 by a transferring arm of the first buffer 400, and the entrance 201 is then closed. It is preferable that the rack 28 is an empty rack from which a different liquid crystal panel has just been unloaded after a bubble of the different liquid crystal panel has been removed. Thus, the method provides for sequentially loading one liquid crystal panel into the reactor chamber 210 after another liquid crystal panel has been removed. If there are no empty racks in the loader 30, the liquid crystal panel 10 is not transported into the reactor chamber 210 at that time. In addition, as mentioned above, when the group of liquid crystal panels 10 is accommodated on a tray, the tray having the group of liquid crystal panels 10 may be loaded into the rack 28 at one time.

At block S5, the pressure and temperature of the reactor chamber 210 are maintained at a predetermined pressure and temperature by a gas pressure supplier 27 and a heat supplier 26, such that a bubble is removed from the liquid crystal panel 10. Accordingly, any bubbles that are formed between either of the color filter and thin film transistor array substrates 12 and 13 and the first and second polarizers 16 and 17, respectively, are rapidly removed. As shown in section "II" of FIG. 6, time that is consumed for removing a bubble is about 10 to about 20 minutes, and it is preferable that the time that is consumed is about 15 minutes. The pressure and temperature of the reactor chamber 210 can be finely controlled in conjunction with a pressure sensor and a temperature sensor. A principle under which a bubble is removed by pressure is described as follows.

Figure 7:
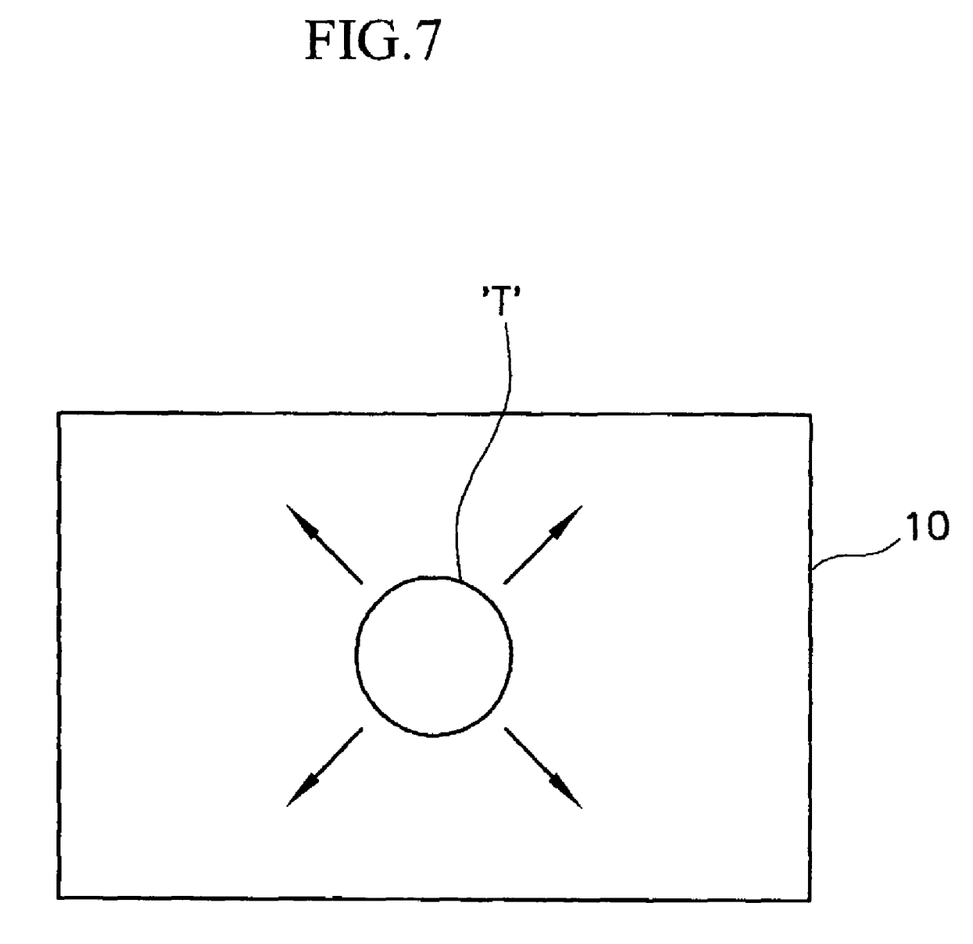
FIG. 7 is a plan view of a liquid crystal panel showing a state in which a bubble is being removed.

As shown in FIG. 7, gas pressure is directed upon a center portion T of the liquid crystal panel 10 and an area of the liquid crystal panel 10 upon which the gas pressure is directed radiates outward from the center portion T, and consequently the bubble is removed from the liquid crystal panel 10 by being forced off an edge of the liquid crystal panel 10.

After the bubble is removed from the liquid crystal panel 10, the liquid crystal panel 10 is extracted from the reactor chamber 210 through the exit 202 by the lifter 29, and the liquid crystal panel 10 is transferred into the second buffer chamber 510 by the transferring arm of the second buffer 500, at block S6. At this time, pressure and temperature of the second buffer chamber 510 are equal to pressure and temperature of the reactor chamber 210.

After the liquid crystal panel 10 is transferred into the second buffer chamber 510, the exit 202 of the reactor chamber 200 is closed such that the reactor chamber 210 is isolated from the second buffer chamber 510. A door of the second buffer chamber 510 is then opened to reduce the temperature and pressure in the second buffer chamber 510, and the liquid crystal panel 10 is carried from the second buffer chamber 510 to the second conveyor 600 by the transferring arm of the second buffer 500, at block S7. The door of the second buffer 500 is then closed and the pressure and temperature of the second buffer chamber 510 are again increased to the pressure and temperature of the reactor chamber 210, at block S8.

Section "III" in FIG. 6 shows the time that is consumed while the pressure and temperature of the second buffer chamber 510 decreases to atmospheric pressure and room temperature, which is about 1 minute.

A bubble removing apparatus and method according to exemplary embodiments of the present invention has several advantages. Examples of the advantages of the bubble removing apparatus and method according to exemplary embodiments of the present invention are listed below.

While a liquid crystal panel is transferred into the reactor chamber and extracted from the reactor chamber, since pressure and temperature of the reactor chamber are not changed, a process line for removing a bubble can be sequentially operated and the liquid crystal panel can be transferred rapidly.

According to exemplary embodiments of the present invention, since liquid crystal panels are sequentially manufactured, an in-line type process line can be applied such that volume production is possible. In addition, according to exemplary embodiments of the present invention, since a liquid crystal panel can be rapidly and effectively processed, the TACT (total average cycle time) can be decreased, and display quality of a liquid crystal display device can be improved.

In addition, since pressure and temperature of the first and second buffer chambers are similar to the pressure and temperature of the reactor chamber, bubble removal from a liquid crystal panel can begin to occur while the liquid crystal panel is in the first buffer chamber. Thus, according to exemplary embodiments of the present invention, time that is consumed for removing a bubble in the reactor chamber is decreased.

While the present invention has been described in detail with reference to the exemplary embodiments, it should be understood that the invention is not limited to the disclosed embodiments, but, on the contrary, is intended to cover various modifications and equivalent arrangements included within the sprit and scope of the appended claims.

What is claimed is:

1. A method for eliminating a display defect in a liquid crystal display device, comprising:
    disposing a liquid crystal panel adhered with a polarizer into a first buffer chamber;
    increasing pressure of the first buffer chamber;
    communicating the first buffer chamber with a reactor chamber having a predetermined pressure;
    transferring the liquid crystal panel from the first buffer chamber to the reactor chamber;
    increasing pressure of a second buffer chamber;
    communicating the second buffer chamber with the reactor chamber; and
    transferring the liquid crystal panel from the reactor chamber to the second buffer chamber.

2. The method of claim 1, wherein a bubble of the liquid crystal panel is removed in the reactor chamber.

3. The method of claim 2, wherein the bubble of the liquid crystal panel is removed in the first and the second buffer chambers.

4. The method of claim 1, further comprising:
    isolating the reactor chamber from the first buffer chamber after the transferring of the liquid crystal panel from the first buffer chamber into the reactor chamber; and isolating the reactor chamber from the second buffer chamber after the transferring of the liquid crystal panel from the reactor chamber to the second buffer chamber.

5. The method of claim 1, wherein the increasing pressure of the first buffer chamber is performed until the pressure of the first buffer chamber is substantially equal to the predetermined pressure of the reactor chamber.

6. The method of claim 1, wherein the increasing pressure of the second buffer chamber is performed until the pressure of the second buffer chamber is substantially equal to the predetermined pressure of the reactor chamber.

7. The method of claim 1, wherein the predetermined pressure of the reactor chamber is about 1 kgf/cm$^2$ to about 6 kgf/cm$^2$.

8. The method of claim 7, wherein the predetermined pressure of the reactor chamber is about 5 kgf/cm$^2$.

9. The method of claim 1, further comprising:
increasing a temperature of the first buffer chamber to a predetermined temperature of the reactor chamber, before communicating the first buffer chamber with the reactor chamber; and
increasing a temperature in the second buffer chamber to the predetermined temperature of the reactor chamber, before communicating the second buffer chamber with the reactor chamber.

10. The method of claim 9, wherein the predetermined temperature of the reactor chamber is about 40° C. to about 80° C.

11. The method of claim 10, wherein the predetermined temperature of the reactor chamber is about 50° C.

12. The method of claim 1, wherein an amount of time for which the liquid crystal panel stays in the reactor chamber is about 10 to about 20 minutes.

13. The method of claim 1, wherein the reactor chamber includes clean air disposed in the reactor chamber.

14. A method for eliminating a display defect in a liquid crystal display device, comprising:
disposing a first liquid crystal panel adhered with a polarizer into a first buffer chamber;
increasing pressure of the first buffer chamber;
communicating the first buffer chamber with a reactor chamber having a predetermined pressure, the reactor chamber already accommodating a second liquid crystal panel;
transferring the first liquid crystal panel of the first buffer chamber to the reactor chamber;
increasing pressure of a second buffer chamber;
communicating the second buffer chamber with the reactor chamber; and
transferring the second liquid crystal panel from the reactor chamber to the second buffer chamber.

15. The method of claim 14, further comprising:
moving a destination rack for the first liquid crystal panel to a same height as the first buffer chamber using a loader provided to the reactor chamber before the first liquid crystal panel is transferred into the reactor chamber; and
moving a source rack for the second liquid crystal panel to a same height as the second buffer chamber using the loader before the second liquid crystal panel is transferred out of the reactor chamber,
wherein the loader comprises a plurality of racks for loading liquid crystal panels, the racks being vertically arranged.

16. The method of claim 14, wherein in response to a number of second liquid crystal panels being transferred from the reactor chamber, a same number of first liquid crystal panels are transferred into the reactor chamber.

* * * * *